April 10, 1962     E. H. JACOBSEN ETAL     3,029,047
COLLAPSIBLE AND PORTABLE ROTARY WING AIRCRAFT
Filed Jan. 17, 1958     8 Sheets-Sheet 1

INVENTOR.
Edward H. Jacobsen
Stanley O. Nelson
BY
Attorneys

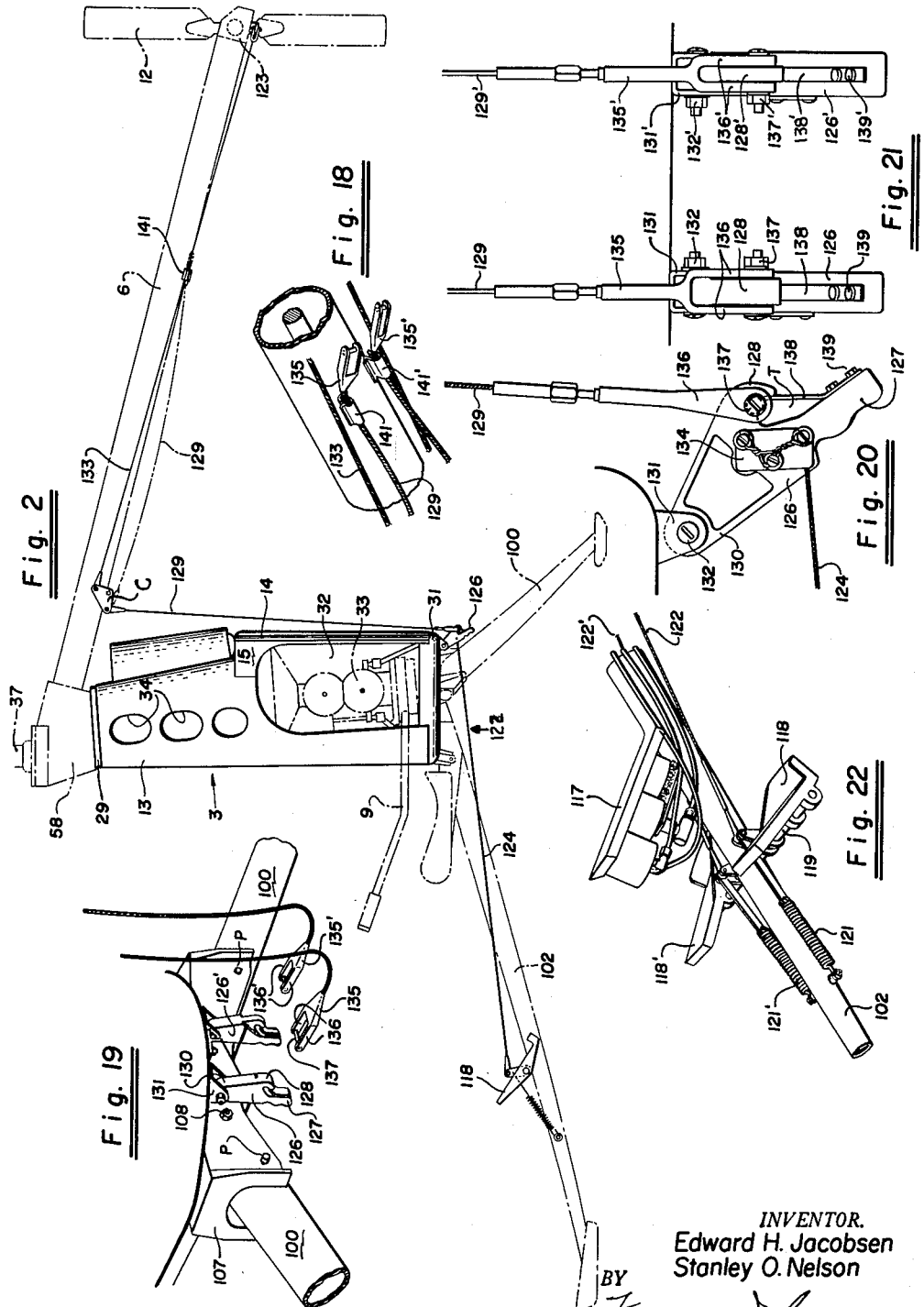

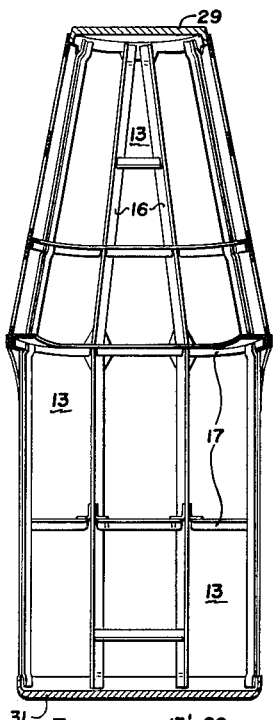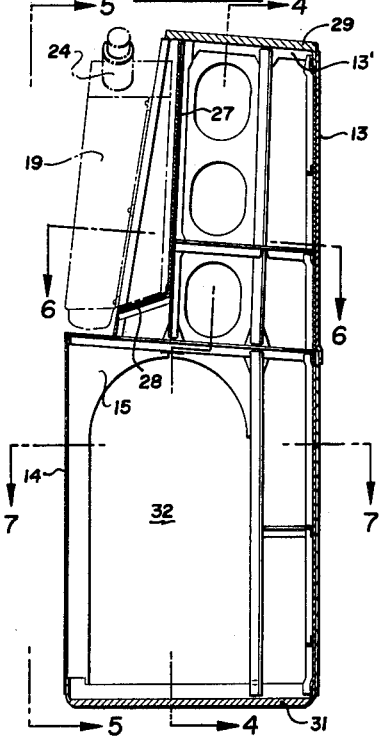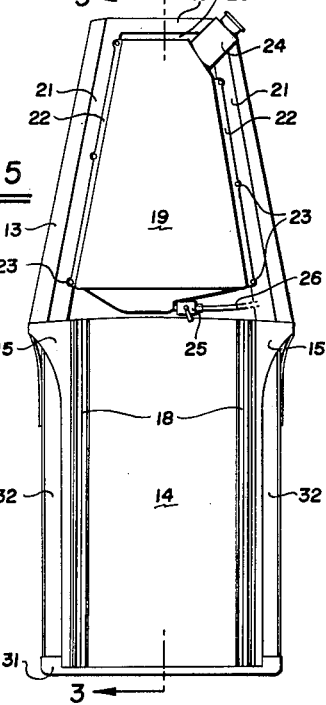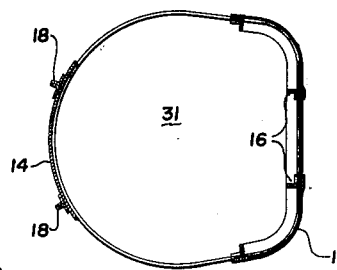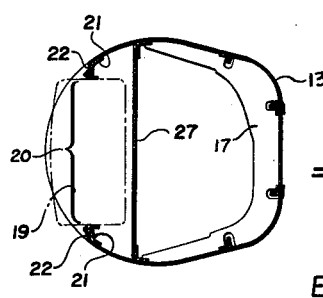
INVENTOR
Edward H. Jacobsen
Stanley O. Nelson
Attorneys April 10, 1962   E. H. JACOBSEN ETAL   3,029,047
COLLAPSIBLE AND PORTABLE ROTARY WING AIRCRAFT
Filed Jan. 17, 1958   8 Sheets-Sheet 4
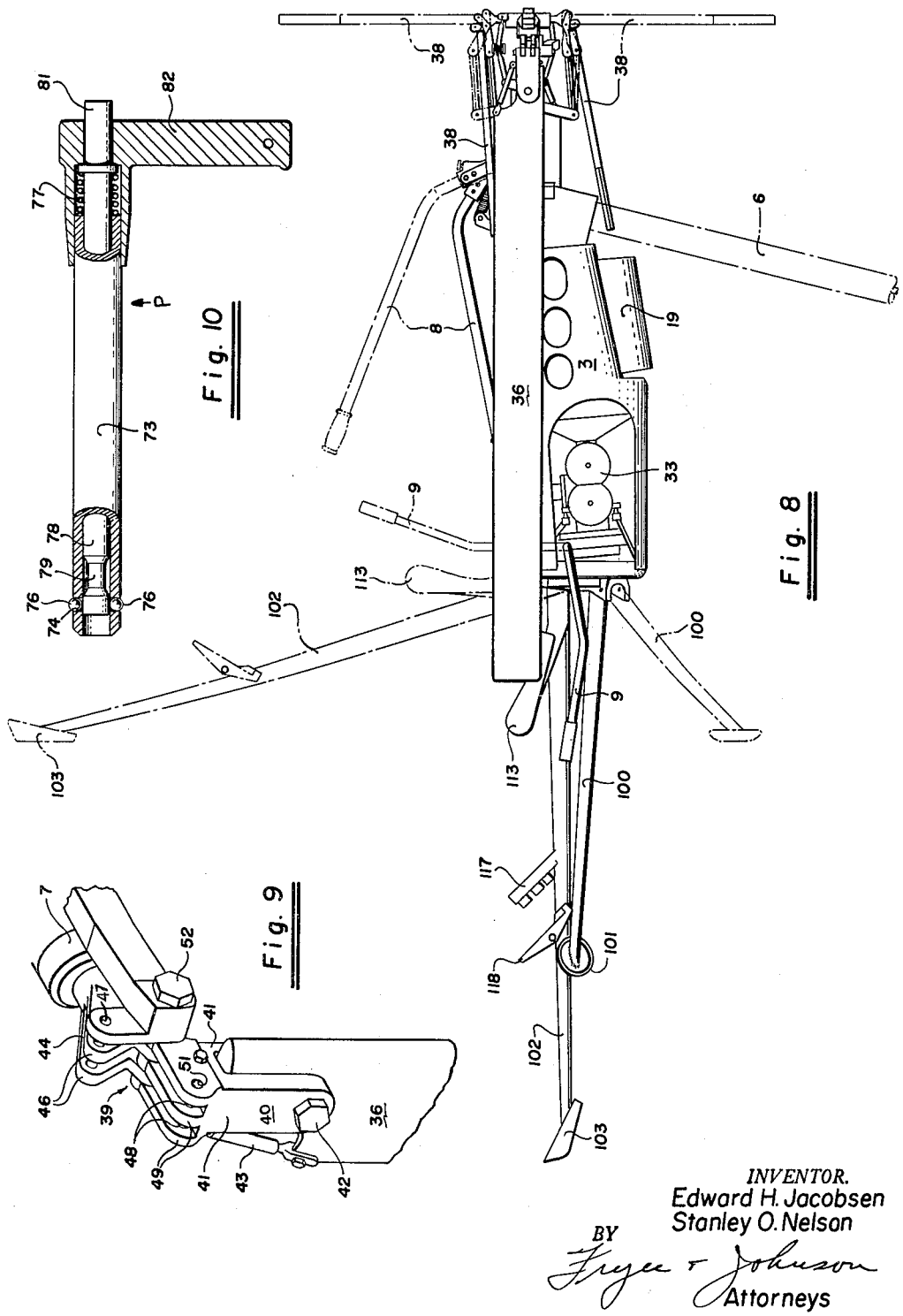
INVENTOR.
Edward H. Jacobsen
Stanley O. Nelson
BY
Attorneys

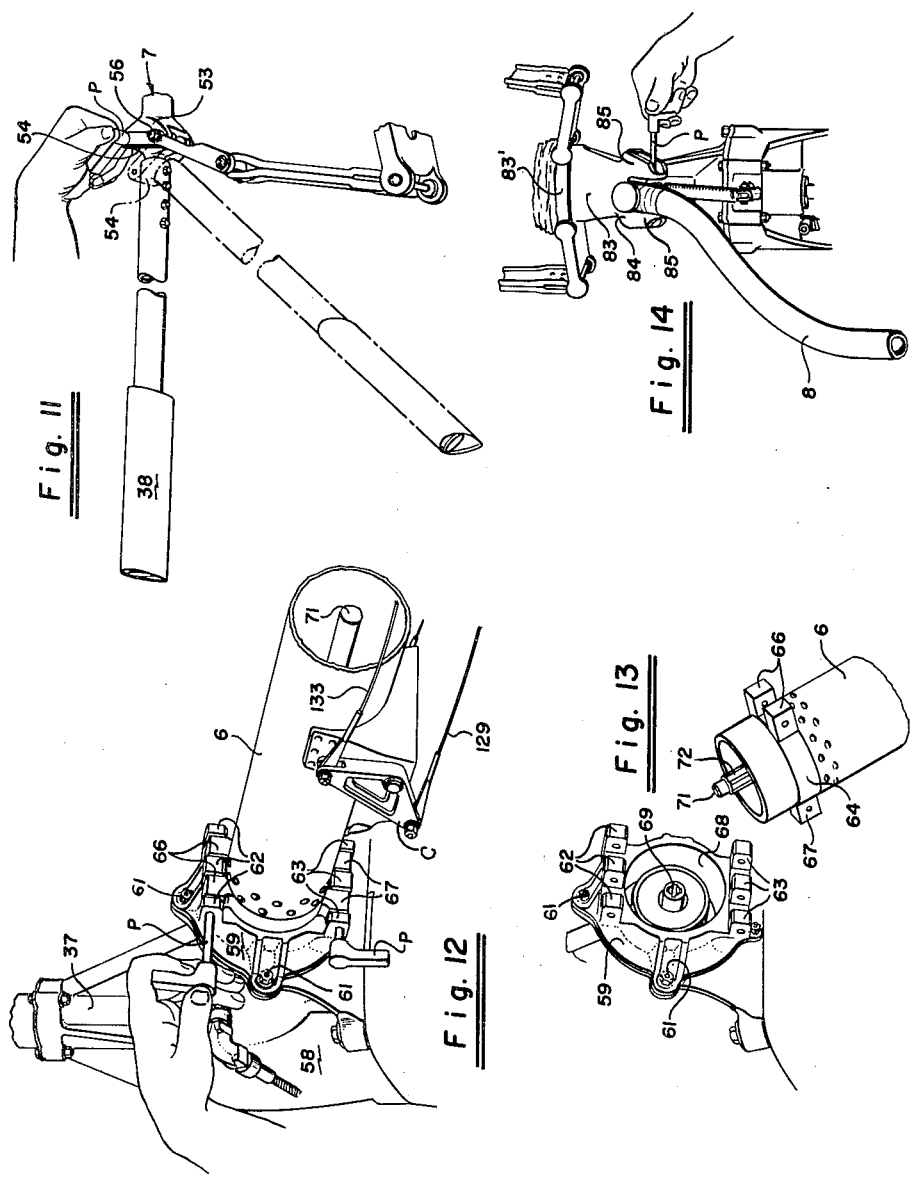

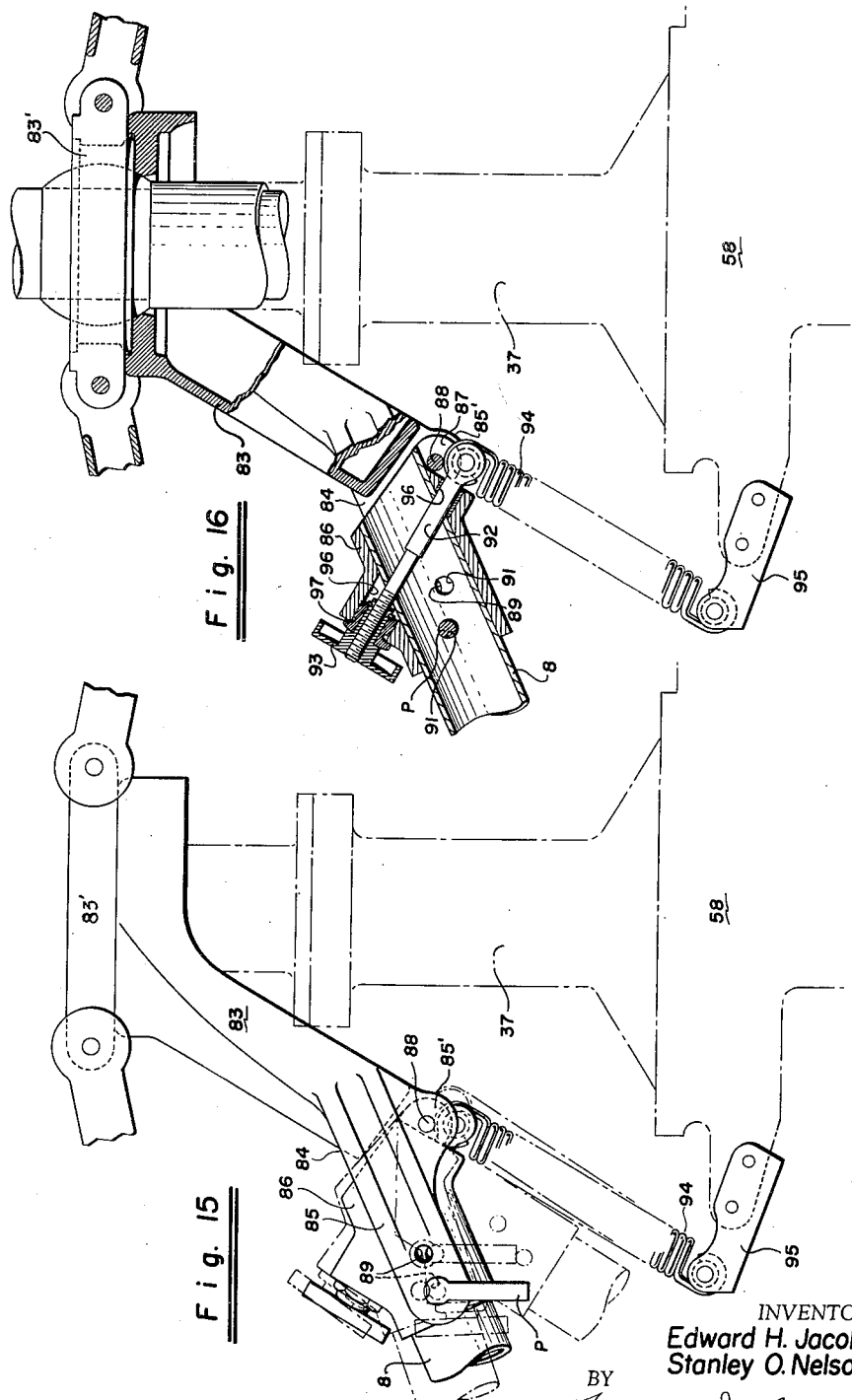

April 10, 1962 E. H. JACOBSEN ETAL 3,029,047
COLLAPSIBLE AND PORTABLE ROTARY WING AIRCRAFT
Filed Jan. 17, 1958 8 Sheets-Sheet 7

INVENTOR.
Edward H. Jacobsen
Stanley O. Nelson
BY
Fryer & Johnson
Attorneys

April 10, 1962 E. H. JACOBSEN ETAL 3,029,047
COLLAPSIBLE AND PORTABLE ROTARY WING AIRCRAFT
Filed Jan. 17, 1958 8 Sheets-Sheet 8

INVENTOR.
Edward H. Jacobsen
Stanley O. Nelson
BY
Attorneys

United States Patent Office 3,029,047
Patented Apr. 10, 1962

3,029,047
COLLAPSIBLE AND PORTABLE ROTARY WING AIRCRAFT
Edward H. Jacobsen, Menlo Park, and Stanley O. Nelson, Los Altos, Calif., assignors, by mesne assignments, to Hiller Aircraft Corp., Palo Alto, Calif., a corporation of California
Filed Jan. 17, 1958, Ser. No. 709,547
13 Claims. (Cl. 244—17.11)

This invention relates to rotary wing aircraft, such as helicopters, and more particularly to a collapsible helicopter which has certain components thereof pivotally or foldably connected thereto and other components thereof detachably connected thereto, whereby the helicopter may be disassembled and collapsed into a portable and light weight folded aircraft package assembly for transportation.

Summarizing this invention it has as its objects, among others, the provision of a collapsible, light weight, one-man aircraft comprising a main body chassis upon which the remainder of the aircraft structure is mounted; the provision of an aircraft rotor column and rotor head including hingedly connected pivotable rotor blades and control paddles; the provision of an aircraft having hingedly connected and pivotable landing gear means; the provision of hingedly connected and pivotable pilot operable flight control means for an aircraft; the provision of a detachable tail rotor boom section for an aircraft and means for quickly detaching or attaching such tail rotor boom section to the aircraft; and the provision of an aircraft which may be collapsed and folded into a portable, easily handled aircraft package assembly.

Referring to the drawings:

FIG. 2 is a more or less schematic side elevation of the helicopter showing the main body chassis and a portion of the flight control means in solid lines with the remainder of the helicopter structure mounted on the chassis shown in phantom lines;

FIG. 3 is a vertical section of the main body chassis of the aircraft taken in the plane of line 3—3 of FIG. 5;

FIG. 4 is a vertical section of the body chassis taken in the plane of line 4—4 of FIG. 3;

FIG. 5 is a rear elevation of the body chassis looking in the direction of arrows 5—5 of FIG. 3;

FIG. 6 is a horizontal section of the body chassis taken in the plane of line 6—6 of FIG. 3;

FIG. 7 is a horizontal section of the body chassis taken in the plane of line 7—7 of FIG. 3;

FIG. 8 is a more or less schematic plan view on a somewhat enlarged scale showing in solid lines the helicopter with the pivotable components thereof pivoted to extend substantially axially of the body chassis to provide a package assembly and with the respective components in position for flight shown in phantom lines;

FIG. 9 is an isometric view of the hinged connection between a rotor blade and the rotor head;

FIG. 10 is a fragmentary sectional view of a quick release retaining pin of the type usable with the helicopter;

FIG. 11 is an isometric view of the hinged connection of a rotor control paddle with the rotor head;

FIG. 12 is an isometric view of the detachable tail boom section of the helicopter secured to the helicopter;

FIG. 13 is an isometric view of the tail boom section of the helicopter detached from engagement with the helicopter;

FIG. 14 is an isometric view of the helicopter directional control stick showing its connection with a portion of the pilot operable flight control means;

FIG. 15 is a side elevation on an enlarged scale of the connection between the directional control stick and the pilot operable control means of FIG. 14;

FIG. 16 is a view similar to FIG. 15 partially in section showing the adjustment mechanism for the directional control stick;

FIG. 18 is an isometric view of a portion of the tail boom section showing free ends of wire sections of the flexible controls of the aircraft retained in clips secured to the boom section;

FIG. 19 is an isometric view of the coupling members and flexible control connectors which comprise quickly detachable connecting means of the helicopter;

FIG. 20 is a plan view of a coupling member and a connector operatively engaged;

FIG. 21 is an elevational view of the coupling members and connectors engaged and shows the difference in width of portions of the respective coupling members and connectors;

FIG. 22 is an isometric view of a leg of the landing gear means showing an instrument panel mounted thereon;

Figure 1:
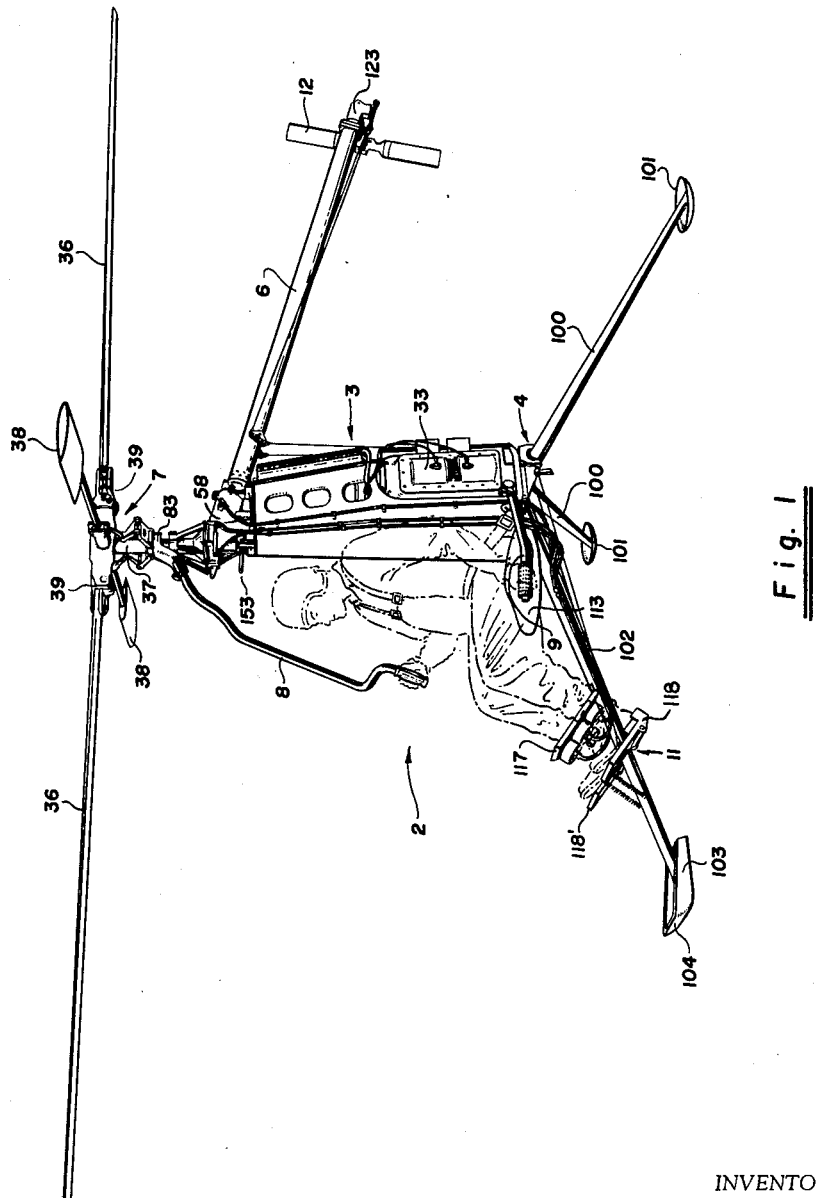
FIG. 1 is an isometric view of the collapsible helicopter of this invention set up and in condition ready for flight.

Referring to FIG. 1, the helicopter 2 of this invention comprises essentially four sections, such sections being a fuselage or main body chassis 3, landing gear means 4, a tail rotor boom 6 and a rotor head or drive head 7.

The rotor head 7 used with the helicopter of this invention may be of any suitable type, and a rotor head of the type shown in U.S. Patent 2,481,750, dated September 13, 1949, or U.S. Patent 2,534,353, dated December 19, 1950, may be used.

To effect flight control of the helicopter, conventional mechanism, such as a pilot operable cyclic pitch control stick 8, a collective pitch control lever 9 and yaw control pedal means 11 operatively connected to a torque compensating tail rotor 12 mounted on the tail boom section 6, may be used. Control stick 8 desirably is connected to the wobble mechanism of rotor head 7 for effecting directional control of the aircraft in flight in the manner disclosed in either of the aforementioned patents. Control lever 9 is effective to control collective pitch of the aircraft in the manner disclosed in aforementioned Patent 2,534,353.

The helicopter illustrated is of the type powered by an internal combustion engine operatively connected to the rotor head to drive the rotor blades. To compensate for the torque developed by the engine and to counteract the same, tail rotor 12 is provided on tail boom section 6. Yaw control pedal means 11 are provided on the aircraft to control the pitch of the blades of tail rotor 12 in the manner described in either of the aforementioned patents. However, if jet engines are mounted on the rotor blades, as shown in U.S. Patent 2,761,635, dated September 4, 1956, such tail rotor 12 and control pedals 11 would not be required.

The aircraft of this invention, because of its small size, light weight and its ability to be collapsed, is well suited for many military and non-military uses. Its military uses include surveillance and reconnaissance, transportation of light weight but critical supplies, courier work, and the like. Additionally, because the aircrafts may be compactly folded into a package assembly, it may be dropped by parachute to effect rescue of stranded persons or for assembly and use by soldiers in the field, Many other military uses will be evident to a person well versed in the military arts.

The average person may be taught to fly the aircraft of this invention in only a few hours and the aircraft, as a result, is well suited for use by large numbers of assault forces each of whom may be equipped with a helicopter of this invention. The non-military uses of the aircraft include carrying a commuter to and from work and the like.

As illustrated in FIG. 1, the helicopter is of the one-man type in that it is intended to carry a single person who serves as pilot for the aircraft. Because of its small size, the aircraft is highly maneuverable and may be used in locales where other more conventional helicopters could not be used.

Desirably, the components of the aircraft, to be described later, are formed from light weight structural metal, such as aluminum or the like, whenever possible whereby the weight of the aircraft may be maintained at a minimum.

The fuselage or main body chassis 3 of the helicopter, which serves as a mounting base for the remaining aircraft structure, will be described first and comprises a substantially tubular, upright elongated body frame structure, which may be formed from light weight aluminum sheets riveted together or otherwise connected in accordance with well known aircraft practice.

Although the body structure of the aircraft chassis may be fabricated from a plurality of plates, such body structure comprises essentially two main parts; namely, principal body section 13 and auxiliary body section 14. As shown in FIGS. 3–7, principal body section 13 forms the major part of the aircraft chassis and includes an upper portion of upwardly converging somewhat conical configuration which terminates in an upper ring 13' upon which the rotor head 7 of the aircraft is mounted, as will be described later. Principal section 13 extends for the full axial length of chassis 3 and provides a somewhat curved continuous front surface which serves as a back rest for the aircraft pilot.

The upper portion of principal section 13 below ring 13' extends rearwardly of the curved front surface to provide substantially flat side surfaces or walls of the tubular chassis. The lower portion of principal section 13 is cut away or removed at opposite sides leaving substantially no side surfaces for approximately half the axial length of such principal section.

Auxiliary section 14 comprises a substantially curved sheet member which is secured to principal section 13 to complete the body chassis of the aircraft. Auxiliary section 14 comprises substantially the entire lower rear portion of the chassis and is provided at its upper end with opposite wrap-around extremities 15 by means of which sections 13 and 14 may be connected and which form part of the side surfaces of the chassis.

To reinforce principal body section 13, as shown in FIG. 4, upright strengthening ribs 16 and transversely extending strengthening ribs 17 are provided. The auxiliary body section 14 desirably is externally reinforced by upright reinforcing ribs 18, as shown in FIGS. 5 and 7. The arrangement of the internal ribs 16 and 17 and the external ribs 18 is only illustrative and such arrangement may be varied in accordance with accepted aircraft practice to meet a particular engineering need. Desirably, however, at least two external ribs 18 are provided on auxiliary body section 14 and may be secured thereto by riveting, welding or the like. Such ribs 18 desirably extend the full length of body section 14 thereby providing the necessary reinforcement for such section throughout its vertical extent.

Body sections 13 and 14 overlap slightly (see FIG. 2) and are removably connected to each other at their overlapping areas in any conventional manner, such as by bolting. Chassis sections 13 and 14, when assembled, impart a substantially tubular configuration to the aircraft chassis which is light weight and sturdy for withstanding flight induced stresses. The external surfaces of both body sections 13 and 14 are curved towards the front and back of the chassis and are somewhat flattened at the sides to impart a streamlined somewhat oval configuration to the chassis 3.

Desirably the upper portion of principal section 13 is substantially open or apertured at its rear surface below ring 13' to provide an opening 20 for the reception of a fuel tank 19. Inwardly directed flanges 21 are provided on section 13 on each side of opening 20 and provide mounting surfaces for the tank 19 (see FIGS. 5 and 6). Because of the somewhat conical configuration of the upper portion of section 13, flanges 21 converge toward the top of section 13, as does opening 20 provided in such section. Fuel tank 19 is provided on each of its side walls with an outwardly extending flange 22 to be secured to the flanges 21 of the chassis section 13. Flanges 22 extend substantially the full length of the tank 19 and the tank side walls converge to conform substantially to the configuration of the opening 20 in section 13 of the chassis. When tank 19 is positioned in the receiving opening 20, it substantially fills such opening, as shown in FIGS. 5 and 6. As a result, flanges 21, tank 19 and auxiliary chassis section 14 comprise the back wall of the main body chassis (see FIG. 5). Suitable connecting means, such as bolts 23, may be used to rigidly connect the fuel tank with the aircraft chassis. Appropriate alignable holes are provided in flanges 21 and 22 to receive such connecting means.

The aircraft chassis is reinforced and strengthened by fuel tank 19 in that the tank 6 extends through the opening 20 so that part of the tank is positioned inwardly of the rear wall of principal section 13 and part of the tank is positioned outwardly thereof (FIG. 5). Fuel tank 19 adjacent its upper end desirably is provided with a fuel inlet 24 and adjacent its lower end with a fuel outlet valve 25 connectable by conventional hose means 26 to the power plant or motor of the aircraft.

Separating the fuel tank from the remainder of the chassis body structure is a substantially upright panel 27 (FIGS. 3 and 6) which serves as a fire wall and also internally braces the opposite side surfaces of principal section 13 of the aircraft chassis. Adjacent its bottom end, fire wall 27 is provided with an extension 28 (FIG. 3) which underlies the bottom of fuel tank 19 to complete isolation of the tank from the remainder of the chassis body structure. Fire wall 27 and extension 28 may be connected to the inner surfaces of principal body section 13 in any conventional manner, such as by bolting or riveting. With reference to FIG. 3, it will be noted that section 13 of the chassis is of less fore and aft width than section 14, thus providing an inwardly recessed upper portion in the chassis for accommodating fuel tank 19 which overlies an inwardly extending stepped portion or shoulder at 28.

As shown in FIGS. 2 to 5, the chassis of the aircraft is completed by the addition of a top pad 29 and a bottom or base plate 31 thereto. Pad 29 and base plate 31 conform generally in configuration to the upper and lower internal extremities respectively of body chassis 3. Ring 13' surrounds pad 29 and is secured thereto in any conventional manner, such as riveting or bolting. Similarly, base plate 31 is at least partially surrounded by the lower extremity of chassis 3 in that the bottom portions of sections 13 and 14 are secured thereto in any suitable manner such as bolting or riveting.

As best shown in FIGS. 2 and 3 the configuration of chassis sections 13 and 14 are such that enlarged apertures or holes 32 are provided in opposite flattened side wall surfaces of the chassis above base plate 31. Such base plate 31 provides a mounting surface to which the helicopter power plant or motor 33 is secured in conventional fashion. As shown in FIGS. 1 and 2, motor 33 occupies a large part of the tubular body chassis and opposite sections of the motor project through apertures 32 provided in the opposite side surfaces of the tubular chassis. In this manner the motor may be reached for minor maintenance and cooling air easily may circulate around the motor to reduce the temperature of the same during operation. Auxiliary body section 14 of chassis 3 is removable from section 13 to allow mounting of motor 33 in the chassis and to facilitate major maintenance work on the motor.

The opposite sides of the chassis above apertures 32 also may be formed with a plurality of holes 34, the purpose of which is to allow additional cooling air to reach the motor as well as to provide access openings through which cables or other necessary mechanisms of the aircraft may extend.

Desirably, the front of the body chassis, as mentioned previously, is rounded and presents a substantially smooth and continuous curved surface which serves as a back rest for the aircraft pilot. Conventional safety straps may be secured to such curved front surface for engagement with the pilot's shoulders and around his waist to maintain the pilot in position on the aircraft during flight.

The remainder of the aircraft structure, including the rotor head 7, is mounted on chassis 3. Such rotor head comprises a plurality of metallic or wooden lift wings or rotor blades 36 symmetrically positioned about the axis of a rotor column 37 upon the end of which the head is supported. Desirably a conventional two-blade rotor is used with the aircraft, but other rotor structures also may be used if so desired. Positioned between blades 36 are control paddles or control blades 38, the purpose of which is described in the aforementioned patents.

Rotor blades 36 are diametrically opposite each other as are control paddles 38, and the paddles extend at right angles relative to the blades in a conventional manner.

As shown in FIG. 8, the paddles 38 and blades 36 are intended to be pivoted or folded downwardly to lie substantially axially of the body chassis 3 adjacent opposite surfaces of the chassis for providing a portable aircraft package assembly. To effect such folding of the blades and paddles, hinged connections or joints are provided between the paddles 36 and blades 38 and the rotor head 7.

Referring to FIG. 9, connecting means for a rotor blade 36 in the form of a two-part hinge 39, is shown. A similar hinged connection is provided for each blade of the lift rotor. One part 40 of the connecting hinge 39 is provided with spaced arms 41 secured over the inboard end of blade 36 by conventional nut and bolt fastening means 42 extending through aligned holes provided in arms 41 and blade 36. To prevent rotation of blade 36 about bolt 42, strut 43 is connected to the hinge part 40 and the trailing edge of blade 36 at the inboard end thereof.

Another part 44 of the hinge 39 is formed as part of rotor head 7. A plurality of fingers 46 extend upwardly from the hinge part 44 and each of such fingers is provided with a transverse hole 47 with all of such holes being aligned for the reception of a retaining pin. Hinge part 40 is provided with a plurality of slots 48 which provide similar spaced fingers 49 adapted to be interengaged with spaced fingers 46 of part 44 when blade 36 is positioned in its laterally extending substantially horizontal position for flight. The spacing of fingers 46 and 49 from each other is substantially equal so that the fingers snugly interfit when the blade is in horizontal position ready for flight thereby preventing fluttering of the blade during high speed rotation. Fingers 49 are provided with aligned holes 51 which are alignable with holes 47 in fingers 46 when the blade is in horizontal position. When in such position a quickly releasable retaining pin may be passed through the aligned holes 47 and 51 to maintain the blade in operative horizontal position.

To allow pivoting of the blade 36 downwardly while maintaining engagement of the blade with the rotor head 7, a pivot bolt 52 is passed through aligned holes provided in the ends of fingers 46 and 49 of the hinge parts opposite holes 47 and 51. Pivot bolt 52 is maintained in engagement with the respective fingers of the hinge connection 39 by any conventional means, such as a nut secured on the end thereof. Upon removal of the retaining pin normally positioned through aligned holes 47 and 51 of fingers 46 and 49 when the blade 36 is in horizontal position, the blade easily may be pivoted downwardly to the position shown in FIG. 9. When in such position the blade lies adjacent the side surface of the aircraft chassis 3 (see FIG. 8) substantially axially of the chassis. The other blade similarly is pivotable downwardly to lie adjacent the opposite side surface of the body chassis.

FIG. 11 illustrates the hinged connection of a control paddle 38 with a portion of rotor head 7, whereby such paddle also may be pivoted downwardly to lie substantially axially of the aircraft chassis. Both paddles 38 desirably are connected to rotor head 7 in the same way. The hinged connection for each paddle 38 comprises a yoke 53 connected to a portion of rotor head 7. Such yoke includes upper and lower pairs of aligned holes passing through the spaced arms thereof. Paddle 38 is provided at its inboard end with a member 54 engageable between the arms of yoke 53 and adapted to be snugly and firmly retained therein. Such member 54 is provided with two vertically spaced holes extending transversely therethrough, one of which is alignable with the upper holes provided in the arms of yoke 53 when paddle 38 is in horizontal position. A bolt 56 extends through the other hole in member 54 and through the lower aligned holes in yoke 53 and acts as a pivot pin about which the paddle may pivot downwardly upon removal of a retaining pin P extending through the upper aligned holes in the yoke 53 and member 54.

FIG. 11 shows paddle 38 in its horizontal flight position in solid lines with retaining pin P extending through the upper aligned holes thereof. The phantom lines of FIG. 11 show paddle 38 pivoted downwardly on bolt 56 after retaining pin P has been removed from the upper aligned holes. Upon removal of an associated retaining pin P each of paddles 38 is free to be pivoted downwardly to the folded position shown in FIG. 8 for transportation of the aircraft.

As mentioned previously, an internal combustion engine 33 may be used to produce the power for driving the rotor blades 36 of the aircraft to propel the same. To effect rotation of such blades, a transmission is positioned in transmission housing 58 which is secured by bolts or the like to the pad 29 mounted atop body chassis 3. The transmission within housing 58 may be of any conventional type suitable for effecting rotation of the rotor blades upon receiving power from conventional drive shaft means (not shown) extending upwardly within chassis 3 and operatively connecting motor 33 to such transmission.

Tail boom section 6 has a torque compensating rotor 12 mounted thereon but it should be understood, however, that if jet engines are mounted on the outboard tips of the rotor blades 36, as is well known in the art, the torque compensating tail rotor 12, and the boom section 6 upon which it is mounted, could be eliminated. In the illustrated embodiment, however, the motor is mounted on chassis 3 and the tail rotor 12 is required to counteract torque. The tail rotor boom section 6 is detachably connected to the aircraft to allow such boom section to be detached when the aircraft is collapsed for transportation. The means by which such tail boom section is connected to the aircraft is shown in FIGS. 12 and 13.

Desirably, the housing 58 for the aircraft drive transmission is provided adjacent its rear end with a mounting plate 59 secured to the housing 58 in any conventional manner, such as by a plurality of nut and bolt fastening means 61. Extending outwardly from such mounting plate 59 are a plurality of spaced upper fingers 62 and spaced lower fingers 63. Each of such fingers 62 and 63 is transversely apertured with the apertures of each group of fingers being aligned.

The tail rotor boom section 6 desirably is tubular in configuration and is formed from light weight metal, such as aluminum. Boom section 6 is provided adjacent its inner end with a mounting collar 64 from which extend outwardly a plurality of upper fingers 66 and lower fingers 67. In the embodiment shown, the upper fingers 62 and lower fingers 63 on the mounting plate 59 are each three in number, while the upper fingers 66 and lower fingers 67 on the collar 64 of the boom section 6 are two in number, whereby the fingers on boom section 6 may be snugly received between the fingers on the mounting plate 59 as shown in FIG. 12.

Mounting plate 59 is provided in its outer face with a recess 68. Recess 68 and the end of boom section 6 are substantially circular in cross section and the end of boom section 6 is adapted to be snugly received within recess 68 thereby insuring a snug engagement between the parts. Operatively connected to the transmission in housing 58 and positioned within recess 68 is an internally splined socket 69. Such socket is rotatable in a conventional manner when the transmission is actuated by the motor 33.

Adapted to be received within socket 69 is a tail rotor drive shaft 71 which desirably extends internally of the tubular tail rotor boom section 6 and is operatively connected with the tail rotor 12 at the outer end of the boom section in a conventional manner. The inner end of rotor drive shaft 71 is provided with an externally splined section 72 which is cooperatively engageable in the socket 69 for effecting rotation of drive shaft 71 when the tail rotor boom section is connected to the transmission housing 58.

As shown in FIG. 12, the tail boom section 6 and mounting plate 59 are maintained in operatively engaged position by two retaining pins P extending through the upper and lower aligned holes of the fingers on the boom section 6 and mounting plate 59. Upon removal of pins P, the tail rotor section 6 may be completely detached from the transmission housing 58 whereby the aircraft may be further prepared for transportation as a package assembly.

Before proceeding further with the description of the collapsible aircraft, attention is directed to FIG. 10 which shows in partial section one type of retaining pin P which has been found suitable to retain the tail boom section in operative engagement with the aircraft as well as retain the rotor blades and control paddles in the horizontal flight position as previously described, and also to retain the other components of the aircraft in operative position as will be described hereinafter. Many other types of pins may be utilized with the aircraft and various size pins are used throughout the aircraft, depending upon the size of the pin-receiving holes.

The retaining pin shown in FIG. 10 is of a commercially available type which is generally referred to as a quick release pin. Such pin comprises a tubular body 73 having adjacent the outer end thereof a plurality of radially extending holes 74 in which are retained balls 76. Extending longitudinally within body 73 and normally urged towards one end thereof by a spring 77 is plunger 78. Such plunger has a circumferential groove 79 adjacent an end into which the balls 76 may move when the plunger 78 is moved to bring groove 79 in line with holes 74. Such movement may be effected by hand pressure applied to the projecting end 81 of the plunger which extends outwardly beyond handle 82 for engagement by the thumb of the user. Handle 82 may be secured to tubular body 73 by swaging or the like.

Upon depressing plunger 78 by pushing inwardly on extending end 81 thereof against the urge of spring 77, the pin may be inserted into aligned holes, in that the balls 76 are free to move radially inwardly into the circumferential groove 79 of the plunger. When the end of the pin has been forced completely through the aligned holes, the plunger 78 may be released, and, under the urge of the spring 77, the plunger moves axially within body 73 to force the balls 76 radially outwardly to a position lying beyond the periphery of the tubular body 73 (as shown in FIG. 10) thereby preventing withdrawal of the pin P from the aligned holes until the plunger is again depressed in the manner described. Desirably the diameter of the tubular body 73 of the pin is to be snugly received within the aligned holes of the respective parts of the aircraft and the size of the pin used will be governed by the size of the holes into which it is to be inserted.

The hinged connection for the pilot operable cyclic pitch control stick is shown in FIGS. 14 to 16. Control stick 8 desirably is connected to an extension 83 of pilot operable flight control means which may be in the form of a wobble mechanism 83' of the type described in the aforementioned patents. Such extension 83 has at its lower end a forked portion 84 into which the upper end of stick 8 projects and in which such stick is pivotable. The opposite arms 85 of forked portion 84 are provided adjacent their inner ends with transversely apertured ears 85' which extend downwardly therefrom. The upper end of stick 8 is provided with a collar member 86 which has ears 87 extending substantially downwardly therefrom. Apertures are provided in ears 87 which are alignable with the apertures in ears 85' of arms 85 and a pivot pin 88 extends through such aligned apertures and provides a pivot axis about which the control stick 8 may be rotated.

Adjacent their lower free ends, arms 85 are provided with a plurality of spaced holes 89 with the holes in opposite arms of the forked portion 84 being aligned with each other. A plurality of spaced holes 91 also are provided through stick 8 and collar member 86. The holes 89 in arms 85 and holes 91 in the stick 8 and collar 86 are positioned in such a manner that only one of the holes 91 is alignable with one of the pairs of holes 89 in the arms 85. It is through such aligned holes that a retaining pin P of the type previously described may be passed for maintaining the stick in operative position for use by the pilot during flight. Upon removal of pin P from the aligned holes, however, the stick is free to pivot downwardly about pivot pin 88 to a position substantially axially of the body chassis as shown in phantom lines in FIG. 15 and in solid lines in FIG. 8. In this manner the stick 8 may be moved to a position adjacent aircraft chassis 3 to impart additional compactness to the aircraft when folded for transportation.

Arms 85 and stick 8 are provided with sets of alignable holes 89 and 91 respectively to provide means whereby the stick may be adjusted to several different positions for the comfort and convenience of the pilot. For example, when retaining pin P is passed through the aligned holes as shown in FIG. 16 and in solid lines in FIG. 15, the stick 8 is maintained fairly close to the chassis 3 for handling by the pilot as shown in FIG. 1. However, if pin P is inserted through the other set of alignable holes shown in FIG. 16, the stick 8 is maintained at a greater distance from chassis 3 as shown in the upper phantom lines of FIG. 15. In this manner, compensation or adjustment of the stick may be made if the pilot is wearing a parachute or the like on his back.

Depending upon the number of alignable holes provided in the stick 8 and arms 85 of forked portion 84, the stick is imparted with several operative positions thereby allowing the pilot to adjust the stick to his convenience. The plurality of alignable holes described, however, are so positioned that a substantial movement is imparted to the stick when the retaining pin P is moved from one set of aligned holes to the other, such movement being as great as eight inches for the lower free end of the stick.

Adjustment means in the form of an eye bolt 92 and thumb screw 93 is provided to allow the pilot to make a fine adjustment of the stick position. Such eye bolt is pivotally connected at one end thereof to a coil spring 94 secured to the transmission housing 58 by any conventional means, such as a bracket 95. Eye bolt 92 extends through appropriate holes 96 formed in stick 8 and collar 86 surrounding the stick. A threaded bushing 97 is positioned in the upper hole 96 in the collar 86 in which an extension of thumb screw 93 is movable. Upon rotating thumb screw 93 fore or aft of the position shown in FIG. 16, the spring 94 urges the stick 8 to a new position, thereby providing a fine adjustment for the stick.

Figure 17:
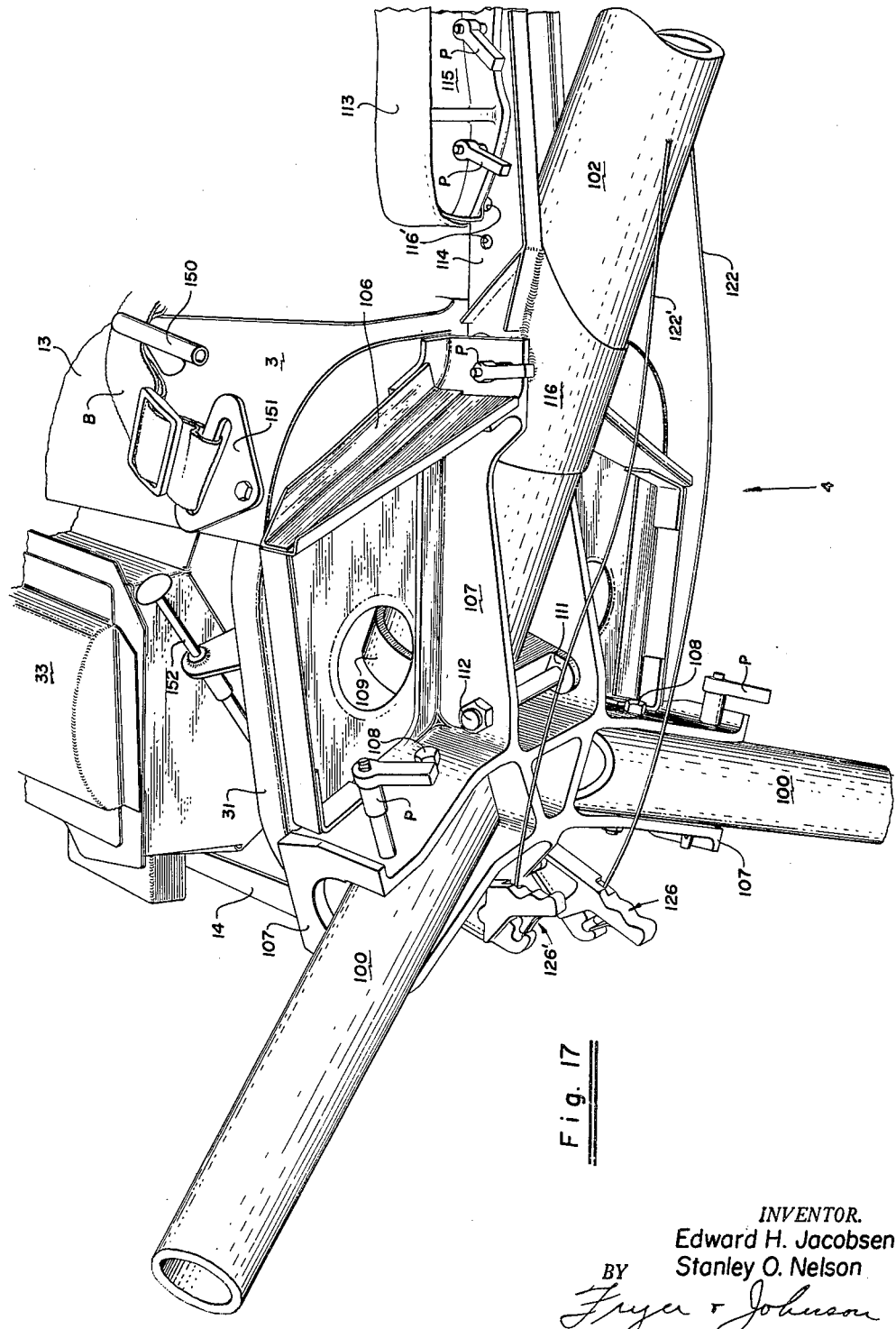
FIG. 17 is an isometric view of the bottom of the helicopter chasis showing the landing gear means pivotally connected thereto.

As shown in FIGS. 1 and 17, the landing gear means 4 of the aircraft extends downwardly and outwardly therefrom and desirably comprises a pair of side aircraft supporting legs 100 which extend laterally and somewhat to the rear of the aircraft in a substantially radial direction relative to chassis 3. Another supporting leg 102 extends substantially radially from the front of the aircraft and such legs provide a tripod landing gear for the aircraft. Desirably, each of legs 100 and 102 are of tapered tubular construction for light weight and strength.

Positioned on the free ends of the side legs 100 are landing pads 101. A landing pad 103 is positioned on the free end of front leg 102. The exact type of landing pads used may vary, however, and if desired wheels may be employed or float type landing gear adapting the aircraft to land on water also may be used. The pads 101 illustrated are substantially saucer shaped and may be secured to the ends of legs 100 in any conventional manner, such as by welding or bolting. Pad 103 desirably is of elongated saucer configuration and is provided with an upturned leading surface 104 which precludes catching of such pad on the ground upon takeoff of the aircraft if the takeoff imparts some forward flight direction to the aircraft before it leaves the ground.

As shown in FIG. 17, landing gear means 4 is secured to the base plate 31 of the aircraft chassis 3 in any conventional manner, such as by welding or bolting. A supporting structure designated 106 and comprising suitable frame members is secured to the base plate 31 in the manner described. Such supporting structure includes a plurality of channel-shaped sections 107 open towards the bottom in which the inner ends of the legs of the landing gear means are hingedly received and which reinforce the supporting structure.

Each of legs 100 is provided adjacent its inner end with aligned holes through which is positioned a pivot bolt 108. The associated channel shaped sections 107 similarly are provided with aligned holes for the reception of such pivot bolts 108. Spaced from the inner ends of the legs 100 another set of aligned holes is provided for the reception of a retaining pin P. Near the outer extremities of the associated channel portions 107, additional aligned holes are provided. It is through such aligned holes in the channel portions 107 and legs 100 that retaining pins P are insertable for maintaining the legs in the operative laterally outwardly and downwardly positions shown in FIGS. 1 and 17 for supporting the aircraft on the ground. Upon removal of the pins P, each of legs 100 is free to pivot downwardly about a bolt 108 to a position substantially axially of the chassis 3 of the aircraft as shown in solid lines in FIG. 8.

The front leg 102 also is pivotable to a position substantially axially of the chassis in the manner similar to legs 100 but is mounted in a slightly different manner to the supporting structure 106 secured to the chassis. As shown in FIG. 17, a collar 109 surrounds the inner end of front leg 102 and such collar is provided with downwardly extending apertured ears 111 through which a pivot bolt 112 may be extended. Such pivot bolt 112 also extends through appropriately formed holes in the associated channel section 107. As shown in FIGS. 1 and 8, front leg 102 is substantially longer than side legs 100 and is so formed to provide a station for supporting a pilot, as shown in FIG. 1. As a result of the extra length of such leg 102, and to maintain all legs when laterally extended at substantially the same angle relative to the body chassis to maintain the aircraft level when on the ground, the inner end of front leg 102 extends upwardly through a recess formed in supporting structure 106 and base plate 31.

The pilot supporting station mentioned previously comprises a seat member 113 (FIGS. 17 and 23) which is supported on a mounting bracket 114 including a collar 116 which surrounds front leg 102 near its inner end. A retaining pin P maintains leg 102 in its operative laterally extending position by passing through aligned holes in collar 116, leg 102 and the outer end of associated channel section 107.

Seat 113 is provided with a base member 115 which straddles mounting bracket 114. Desirably a plurality of transverse holes 116' are provided through mounting bracket 114. As a result of the plurality of holes 116' formed in bracket 114, seat 113 may be slidably adjusted relative to body chassis 3. That is, the seat may be moved toward or away from the body chassis 3 merely by removing the pair of pins P, adjusting the seat on bracket 114, and reinserting the pins through the aligned holes in mounting bracket 114 and base member 115. The adjustable characteristics of the seat, taken in conjunction with the adjustable characteristics of the flight control stick 8 described previously, adapt the aircraft for use by a person wearing equipment on his back, such as a combat soldier wearing a combat pack or a pilot wearing a parachute. Desirably, seat 113 is of the type commonly known as a bicycle seat but other types of pilot supporting seats also may be used.

As shown in FIG. 1, the pilot operable control stick 8 depends downwardly from the rotor column and rotor head 7 to a position overlying the pilot supporting station whereby a pilot may grasp the end of the control stick with one hand for manipulation thereof.

Positioned on front leg 102 at a location spaced from seat 113 is an instrument panel 117, which includes the necessary flight instruments such as tacometer, fuel indicator, flight hour indicator, and the like. Such instruments are in a position to be easily seen by the pilot. Such an instrument panel, however, could be positioned in other locations on the aircraft such as, for example, on the lower end of control stick 8. Also positioned on front leg 102 is the tail rotor control means 11 mentioned previously. Such control means desirably comprises a pair of foot pedals 118 and 118'. Such pedals, as shown most clearly in FIG. 22, are pivotable on a rod 119 connected to the front leg 102. Pedals 118 and 118' are spring urged toward the free outer end of leg 102 by coil springs 121 and 121' each secured at one end to leg 102 and at the other end to its associated foot pedal.

Pedals 118 and 118' provide means to control the pitch of the blades of tail rotor 12 for controlling yaw of the aircraft. Such tail rotor pitch may be modified by operating the yaw control pedals in a well known manner. The pedals are operatively connected to tail rotor 12 by flexible controls 122 and 122' (see FIGS. 2 and 22). Such flexible controls extend between pedals 118 and 118' and conventional mechanism 123 mounted adjacent the end of the tail rotor boom section 6 for changing the pitch of tail rotor blades in a well known manner.

To allow the tail rotor boom section 6 to be completely detached from the aircraft in the manner described previously for transportation, the flexible controls 122 and 122' each include a plurality of separate wire sections. Connecting and disconnecting means are provided for quickly detaching and connecting opposite ends of such wire sections. Such quickly detachable connecting means are shown in FIGS. 19, 20 and 21.

Each of the connecting means is substantially the same in construction and in manner of use and to facilitate description, only one such connecting means, and the wire sections for only one flexible control, will be specifically described. However, in the drawings, similar reference numerals are used for similar parts with the control parts being differentiated by primes.

Control 122, as mentioned, includes a plurality of wire sections. One of such sections extends between pedal 118 and a coupling member 126 and is designated 124. Such coupling member, as shown in FIGS. 19 and 20, is flat and elongated and includes a hand engageable handle portion 127 extending from one end thereof. A hook-shaped portion 128 is provided adjacent such handle portion but spaced therefrom thereby forming a throat opening T between such portions. The upper end 130 of coupling member 126 desirably is pivotally connected to the aircraft chassis 3 adjacent the bottom thereof by a bracket 131 and pivot pin 132.

Another of the wire sections comprising flexible control 122 is designated 129 and, when the tail rotor boom is in operative position ready for flight as shown in FIG. 2, wire section 129 extends substantially between the tail boom section and the coupling member 126 and is detachably connected with the latter. Pivotally connected to tail boom section 6 near the inboard end thereof is a bell crank C (see FIG. 2) to which the upper end of wire section 129 is connected. Extending between bell crank C and the pitch control mechanism 123 of tail rotor 12 is a third flexible control wire section designated 133. Bell crank C transmits movement from wire section 129 to wire section 133. As a result, when wire section 129 is connected to coupling member 126, movement of pedal 118 produces corresponding pitch change of the blades of tail rotor 12 due to the operative connection of wire sections 124, 129 and 133 of flexible control 122. While bell crank C desirably is provided on tail rotor boom 6 as described, other equivalent structure could be mounted on the tail boom section to transmit motion from pedal 118 to mechanism 123 through wire sections 129 and 133.

An end of each of wire sections 124 and 129 terminates adjacent the bottom of the chassis adjacent the back thereof. The front end of wire section 124 is connected to pedal 118 while the other end of such wire section fixedly is secured to the associated coupling member 126 by any suitable means, such as by a clamping plate 134 which securely clamps the wire end to the coupling member. The bottom end of wire section 129 is snap engaged with the coupling member 126 when the tail boom section 6 is operatively connected to the aircraft. To facilitate such detachable snap engagement of the bottom end of wire section 129 with coupling member 126 a clevis type connector 135 having a pair of spaced arms 136 and a pin 137 extending transversely between the spaced arms adjacent the ends thereof is mounted on the lower end of wire section 129.

Rapid connection of the clevis connector 135 with coupling member 126 may be effected merely by grasping the handle portion 127 of the coupling member and pulling such portion and the coupling member in a direction away from the control pedal 118; that is, in a direction rearwardly of the aircraft. Because of the spring connection of pedal 118 with front leg 102, such pedal may be pivoted about rod 119 toward the chassis of the aircraft a distance sufficient to allow engagement of the pin 137 of the connector 135 with the hook shaped portion 128 of the coupling member 126. It is in this manner that the quick connection between wire sections 124 and 129 may be made. Such quick connection results in a pre-tensioning of the flexible controls 122 in that the spring 121, after operative connection of the ends of the wire sections, urges the pedal 118 to its operative position.

To preclude accidental disengagement of the connector 135 from the coupling member 126, retaining means is movably positioned across the throat opening T of the coupling member. Such retaining means desirably takes the form of a spring latch 138 connected by screws 139, or equivalent means, to the inner surface of handle portion 127. To remove the connector 135 from engagement with the coupling member 126, it only is necessary to pull outwardly on the handle portion 127 of the coupling member while the spring latch 138 is depressed until sufficient play is provided in wire section 129 to allow movement of the pin 137 of the connector 135 over the end of hook shaped portion 128.

As shown in FIG. 21, the hook shaped portions 128 and 128' of the respective coupling members 126 and 126' are of substantially different width. Similarly, the arms 136 and 136' of respective connectors 135 and 135' are spaced apart a different distance and such spacing distance corresponds substantially to the width of the associated hook shaped portion of the associated coupling member. In this manner, crossing of the flexible controls of the aircraft is precluded in that the arms 136' of the connector 135' cannot be engaged over the relatively wide hook shaped portion 128 of connector 126. A person attempting to engage connector 135' with coupling member 126 will be unable to do so and will immediately realize his error thereby insuring proper operative engagement of wire sections 129 and 129' with wire sections 124 and 124' respectively whereby flexible controls 122 and 122' will be effective to control tail rotor 12.

When tail rotor boom section 6 is disengaged from the aircraft and connectors 135 and 135' are disconnected from coupling members 126 and 126' as described, it generally is undesirable to leave the lower ends of wire sections 129 and 129' dangling free. To preclude such conditions, sheet metal clip members 141 and 141' are secured in any convenient manner, such as welding, intermediate the ends of tail rotor boom section 6. The free ends of wire sections 129 and 129' are engageable in the sheet metal clips 141 and 141' (FIG. 18) and the tail rotor boom section 6 thus may be handled easily when detached from the aircraft. The phantom lines in FIG. 2 show the doubled-back position of the wire sections when retained in the clips.

Figure 23:
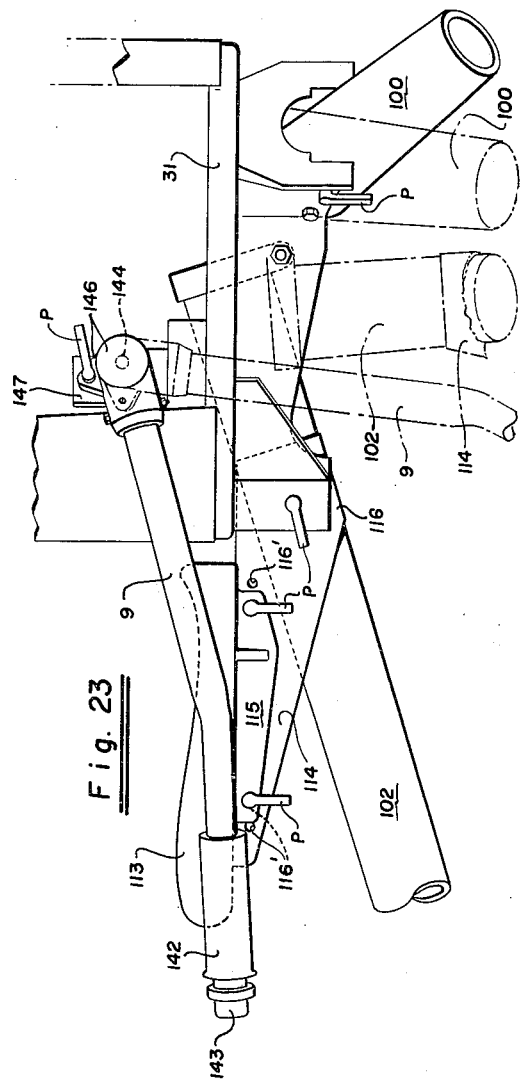
FIG. 23 is a side elevation on an enlarged scale of a lower portion of the aircraft illustrating the pivotal connection of the landing gear and the flight control lever with the aircraft.

As shown in FIG. 23, the collective pitch control lever 9 extends substantially laterally from the aircraft chassis 3 adjacent the pilot supporting station and substantially parallel to seat 113. In such position the control lever easily may be grasped by the pilot to control collective pitch of the lift rotor blades in the conventional manner.

The outer end of control lever 9 is provided with a motor throttle in the form of a rotatable hand grip 142. Hand grip 142 is of the type generally found on motorcycles and is operatively connected to the fuel supply for motor 33. The amount of fuel fed to motor 33 from fuel tank 19 may be increased or decreased by rotating grip 142 in a predetermined direction in a well known manner. A throttle control friction lock 143 may be secured to the outer end of throttle hand grip 142 to maintain the throttle at a given setting.

The inner end of control lever 9 desirably is hingedly and pivotally connected to the chassis 3 of the aircraft by means of a pivot pin 144. The inner end of lever 9 is provided with a collar 146 surrounding the end thereof and secured thereto in any conventional manner, such as by swaging or the like. A mounting plate 147 is operatively connected to chassis 3 in any conventional manner. The collar 146 on lever 9 and the plate 147 on chassis 3 are provided with transverse alignable holes through which a quick release retaining pin P extends. When pin P is positioned through such aligned holes, lever 9 is maintained in operative horizontal position adjacent seat 113.

Upon removal of pin P from the aligned holes in collar 146 and plate 147, lever 9 may be pivoted downwardly to lie substantially axially of the chassis 3 in the position shown in FIG. 8.

FIG. 23 also illustrates the pivotable characteristics of the tripod landing gear of the aircraft as well as the multi-position adjustments available for seat 113 on front leg 102. As shown in such figure, seat 113 pivots downwardly with leg 102 and cannot freely slide along leg 102 in that collar 116 embraces leg 102 sufficiently tightly to preclude inadvertent movement when pin P is removed to allow pivoting of leg 102.

Figure 24:
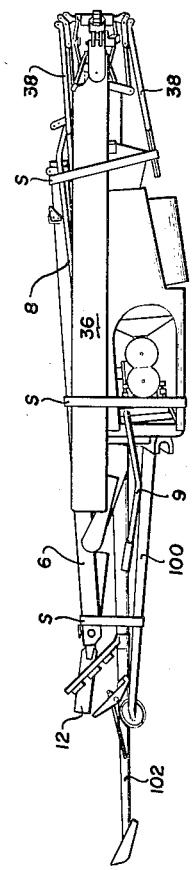
FIG. 24 is a plan view of an aircraft package assembly comprising a complete helicopter ready for transportation.

From the foregoing, it should be understood that the assembled-for-flight aircraft shown in FIG. 1 rapidly may be disassembled and collapsed to the folded condition shown in FIGS. 8 and 24 merely by removing eleven of the quick disconect retaining pins P from the aligned holes provided therefor. The eleven pins to be removed include one for each of the rotor blades 36 and paddles 38, two for the detachable tail boom section 6, one for each of the landing gear legs 101 and 102, one for the cyclic pitch control stick 8 and one for the collective pitch and throttle control lever 9. To preclude loss of the pins removed, each of such pins may be chained or otherwise connected to the aircraft adjacent its position of use so that the pins are readily available when needed in setting up a collapsed aircraft.

Although generally not required for flight of the aircraft, a ground adjustable stabilizer (not shown) may be horizontally positioned on tail boom section 6 between tail rotor 12 and the aircraft chassis. Such an optional stabilizer would impart added stability to the aircraft, if needed, in flight.

The aircraft of this invention is readily collapsible and the tail rotor boom section thereof is readily detachable to provide a compact aircraft package assembly which may be easily transported and which may be dropped by parachute to troops in the field or the like. As shown in FIG. 24, a complete and compact aircraft package assembly may be provided by securing the detached tail rotor boom section 6 to the collapsed aircraft by a plurality of straps S or equivalent fastening means.

A suitable motor 33 utilized with the aircraft of this invention is a two-cycle, four cylinder, horizontally opposed air cooled type rated at 40 H.P. at 4000 r.p.m. Such motor is of relatively light weight and produces sufficient horsepower to properly operate the aircraft. The aircraft is of comparatively light weight, weighing only 250–270 pounds, depending upon instruments and the like mounted thereon, yet the aircraft is capable of a high pay load and is designed to carry a 180 pound man wearing a field pack weighing up to 60 pounds.

Motor 33 in the embodiment illustrated is started by a pull cord starter 150 (see FIG. 17) of the type frequently used to start outboard boat engines but other starter systems may be used. FIG. 17 also shows a safety belt B secured to the aircraft chassis by means of a plate 151 bolted to the chassis. A spark control lever 152 of conventional type also is shown in FIG. 17 and is operable to control the spark of motor 33.

A friction brake engageable with the rotor column of the aircraft in a conventional manner may be provided on the aircraft for rapidly stopping the rotation of the rotor and allowing the pilot to deplane in a few seconds after landing. If such a brake is incorporated with the aircraft, a pilot operable handle 153 may be positioned above the pilot supporting station (see FIG. 1) for ready access by the pilot to stop rotation of the rotor column.

The aircraft shown in FIG. 1 may be disassembled and folded to provide a package assembly of the type shown in FIGS. 8 and 24 in different sequences but a suitable sequence is as follows: first, the tail rotor boom section 6 is removed by disconnecting the ends of wire sections 129 and 129' of the flexible controls from the coupling members 126 and 126' and thereafter removing the pins P securing the boom section to the transmission housing 58. With the tail boom section detached, a control paddle 38 extending rearwardly of the aircraft may be folded down by removing the associated retaining pin. Thereafter the aircraft may be rocked over on its back; that is, so that the aircraft is resting on fuel tank 19. In this position, the other control paddle may be folded axially of the chassis and rotor blades 36 may be folded to lie adjacent opposite sides of the chassis. Thereafter, control stick 8 and control lever 9 may be pivoted to lie substantially axially of the chassis. Finally legs 100 and 102 may be pivoted to extend substantially axially of the chassis from the bottom end thereof.

The collapsible aircraft package assembly provided when the tail boom is detached and the components of the aircraft pivoted as described provides a compact package which may be readily handled and which may be transported into the fields for setting up there. The aircraft may be set up and assembled for flight in a few minutes by reversing the above mentioned sequence of operations.

The various features of the invention described herein are intended to be illustrative only and other equivalent features may become evident to a person skilled in the art without departing from the spirit of this invention, and such invention should be interpreted in light of the appended claims.

We claim:

1. A collapsible and portable light weight rotary wing aircraft comprising a main body chassis upon which a rotor column is mounted, a single rotor head mounted on said rotor column with at least two rotor blades hingedly and foldably connected to said rotor head, and landing gear means hingedly and foldably connected adjacent the bottom of said chassis, said rotor blades and said landing gear means being maintained in operative position extending generally transversely relative to said rotor column and said chassis by pin means disengageably engaged therewith, said blade and said landing gear means being pivotable to lie substantially axially of said chassis and said rotor column upon disengagement of said pin means whereby said aircraft may be collapsed and folded into a compact package assembly for transportation.

2. A collapsible and portable light weight rotary wing aircraft comprising a man body chassis upon which a rotor column is mounted, a single rotor head mounted on said rotor column comprising at least two rotor blades hingedly and foldably connected to said rotor head, a detachable and separable tail rotor boom section removably secured to said aircraft, and landing gear means hingedly and foldably connected adjacent the bottom of said chassis, said rotor blades and said landing gear means being maintained in operative position extending generally transversely relative to said rotor column and said chassis by pin means disengageably engaged therewith, said blades and said landing gear means being pivotable to lie substantially axially of said chassis and said rotor column upon disengagement of said pin means, and said boom section being completely detachable from said aircraft whereby said aircraft may be disassembled, collapsed and folded into a compact package assembly for transportation.

3. A collapsible and portable light weight one-man helicopter adapted to be disassembled, collapsed and folded into a compact package assembly for transportation comprising a main body chassis which is upright when said aircraft is at rest on the ground, a rotor column mounted on said chassis and extending upright therefrom, rotor blades extending laterally from said column and hingedly and foldably connected therewith, said blades being pivotable to lie substantially axially of said chassis adjacent surfaces thereof when so pivoted, a tail rotor boom section removably secured to said aircraft and detachable therefrom for transportation, landing gear means hingedly and foldably connected to said chassis and extending downwardly and outwardly therefrom, said landing gear means comprising a plurality of supporting legs pivotable to lie substantially axially of said chassis, a pilot supporting station mounted on one of said legs and pivotable therewith, pilot operable flight control means connected to said rotor blades including a control stick extending above said supporting station, means hingedly connected to the upper end of said stick for inward folding thereof to lie substantially axially of said chassis, and a pilot operable substantially laterally extending control lever hingedly connected adjacent said supporting station and pivotable to lie substantially axially of said chassis, said aircraft when said boom section is detached and said blades, landing gear means, stick and lever are pivoted providing a readily transportable compact helicopter package assembly.

4. A chassis for a light weight portable rotary wing aircraft comprising a substantially tubular hollow upright body frame structure which is elongated along an upright axis whereby it is longer along such axis than the maximum width thereof, a pad secured to the upper end of said structure providing a surface upon which the wing rotating drive transmission of said aircraft may be mounted, a base plate secured to the bottom of said structure, said structure being provided with a hole in each of opposite sides thereof adjacent said base plate and being stepped and recessed inwardly above such holes said base plate providing a surface upon which the motor of said aircraft may be mounted with the motor positioned within said hollow structure and with opposite portions of the motor located adjacent said holes with drive shaft means positionable within said structure between such motor and such transmission for actuating the transmission to rotate the wings of said aircraft, and a fuel tank secured to said structure over the inwardly stepped portion and in said inwardly recessed portion for supplying fuel to such motor and for reinforcing and strengthening said structure.

5. A collapsible and portable light weight rotary wing aircraft comprising an upright substantially tubular structure providing a main body chassis, a base plate secured to the bottom of said chassis and a motor mounted thereon, a pad secured to the upper end of said structure, a drive transmission mounted on said pad and operatively connected to said motor, a rotor column extending upwardly from said transmission and rotatable thereby, a plurality of rotor blades hingedly and foldably connected to said column and pivotable to lie substantially axially of said chassis adjacent surfaces thereof, a tail rotor boom section removably secured to said transmission including tail rotor blades rotatably connected to said transmission, said boom section being completely detachable from said transmission for transportation, tri-pod landing gear means hingedly and foldably connected to said bottom plate comprising three downwardly and outwardly extending legs for supporting said aircraft on the ground, said legs being pivotable to lie substantially axially of said chassis, one of said legs having a pilot supporting station mounted thereon and pivotable therewith, pilot operable flight control means connected to said rotor column including a control stick extending downwardly therefrom over said pilot station, the upper end of said stick being hingedly and foldably connected to said control means whereby said stick may be pivoted to lie substantially axially of said chassis adjacent a surface thereof, and a pilot operable control lever hingedly and foldably connected adjacent said pilot station also pivotable to lie substantially axially of said chassis, said aircraft when said tail boom section is detached and said blades, legs, control stick, and control lever are pivoted providing a compact readily transportable aircraft package assembly.

6. A light weight rotary wing aircraft package assembly comprising a main body chassis elongated along an axis, a rotor column connected to said chassis and extending therefrom adjacent one end of said axis, a plurality of rotor blades hingedly connected to said column and pivoted to a position substantially axially of said chassis substantially in engagement with sides of said chassis, landing gear means hingedly connected to said chassis adjacent the opposite end of said chassis axis comprising a plurality of legs pivoted to a position substantially axially and beyond said opposite end of said chassis axis, and pilot operable flight control means comprising a control stick and a control lever hingedly connected to said aircraft and pivoted to a position substantially axially of said chassis whereby a compact and portable columnar like package assembly is provided for ease of transportation.

7. The package assembly of claim 6 wherein a detached separate tail rotor boom section adapted to be secured to said aircraft during flight is connected with said package assembly as part thereof whereby a complete aircraft is compactly maintained in package form for transportation.

8. A light weight, portable one-man helicopter certain components of which are foldable and detachable whereby said helicopter may be collapsed and folded into a compact package for transportation, comprising a main body chassis upon which the foldable and detachable components of said aircraft are mounted for flight, said chassis extending generally upright when said helicopter is at rest on the ground, a rotor column extending upright from the top of said chassis, a single rotor head mounted on said rotor column and rotatable therewith, at least two rotor blades extending radially from said rotor head and connected thereto by hinge means, removable lock means fixedly securing each of said blades to said rotor head and maintaining said blades in operative position extending transversely relative to said rotor column, said blades being pivotable and foldable axially of said rotor column and closely adjacent to said chassis upon removal of said lock means, landing gear means comprising a plurality of legs extending downwardly and outwardly from said chassis adjacent the bottom thereof, said legs being hingedly and foldably connected to said chassis, other removable lock means fixedly securing and maintaining said legs in the operative downwardly and outwardly extending position whereby said chassis may be supported in such upright position when the aircraft is at rest, said legs being pivotable and foldable in the same direction as said rotor blades when said other lock means are removed whereby said legs may be positioned to extend generally axially of said chassis from the bottom thereof, pilot operable control means operatively connected with said rotor blades, said control means being hingedly and foldably connected to said aircraft whereby the same may be pivoted generally axially of said chassis to lie closely adjacent thereto, and a tail boom section including a torque compensating tail rotor removably connected with said chassis, said tail boom section being completely separable from said chassis, whereby when said rotor blades, said legs and said control means are folded to extend axially of said chassis and closely adjacent thereto the complete helicopter is securable in a compact columnar-like package free of substantial transverse projections for ease of transportation and subsequent unfolding and assembly for flight.

9. A folded portable aircraft secured in a columnar-like package assembly from which a light weight one-man helicopter may be unfolded for flight comprising an elongated body chassis, a plurality of chassis supporting legs extending generally axially from the bottom of said chassis and pivotally connected thereto, one of said legs having a pilot supporting station mounted thereon and pivotable therewith, a rotor column extending generally axially from the top of said chassis, a single rotor head mounted on said rotor column, at least two rotor blades folded axially of said rotor column and lying closely adjacent to said chassis, said blades being connected to said rotor head by hinge means, at least two control paddles folded axially of said rotor column and also lying closely adjacent to said chassis, said control paddles being connected by other hinge means to said rotor head with a control paddle positioned between a pair of rotor blades, pilot operable control means operatively connected with said control paddles and said rotor blades and folded generally axially of said chassis and lying closely adjacent thereto, and securing means surrounding said chassis, said legs, said blades, said paddles and said control means and maintaining said aircraft in said columnar-like package; said legs, said rotor blades, said control paddles and said control means being pivotable transversely relative to said chassis and maintainable in operative position by lock means when said aircraft is readied for flight; said folded assembly being generally free of substantial transverse projections and being readily portable whereby an entire helicopter may be transported to and prepared for flight at any predetermined location.

10. A light weight, portable one-man operable helicopter adapted to be collapsed into a compact package with components extending longitudinally along substantially the same axis comprising a main body chassis elongated along said axis to provide a greater length along such axis than the maximum width thereof and normally upright when the helicopter is at rest on the ground or in flight, a plurality of landing gear legs normally extending downwardly and outwardly from adjacent the bottom of said chassis, means hingedly connecting each of said legs to said chassis on an axis extending transversely to said chassis axis for downward movement from said normal position to a collapsed position with reference to said chassis, manually releasable means for locking said legs in their normal position, a rotor system mounted on the top of said chassis including a rotor head and at least two rotor blades normally extending outwardly from said head, means hingedly connecting each of said rotor blades to said head on an axis also extending transversely to said chassis axis for downward movement from such normal position to a collapsed position substantially in engagement with a side of said chassis, manually releasable means for locking said rotor blades in their normal position, and a tail boom detachably connected to said chassis for complete disconnection therefrom and which when detached can be packaged alongside said chassis, blades, and legs.

11. A light weight, portable one-man operable helicopter adapted to be collapsed into a compact package with components extending in the same direction longitudinally along substantially the same axis comprising a hollow main body chassis elongated along said axis to provide a greater length along such axis than the maximum width thereof and normally upright when the helicopter is at rest on the ground or in flight, an engine, means mounting said engine substantially within the hollow of said chassis adjacent the bottom thereof, a fuel tank carried by said chassis above said engine, a plurality of landing gear legs normally extending downwardly and outwardly from adjacent the bottom of said chassis, means hingedly connecting each of said legs to said chassis on an axis extending transversely to said chassis axis for downward movement from said normal position to a collapsed position with reference to said chassis, manually releasable means for locking said legs in their normal position; a rotor system mounted on the top of said chassis including a rotor head, a rotor column connecting said engine to said rotor head and at least two rotor blades normally extending outwardly from said head; means hingedly connecting each of said rotor blades to said head on an axis also extending transversely to said chassis axis for downward movement from such normal position to a collapsed position substantially in engagement with a side of said chassis, the outboard end portions of said blades in said collapsed position extending beyond the bottom of said chassis and beyond the hinge connections of said legs with said chassis; manually releasable means for locking said rotor blades in their normal position; and a tail boom detachably connected to said chassis for complete disconnection therefrom and which when detached can be packaged alongside said chassis, blades and legs.

12. The helicopter of claim 10 wherein a pilot's seat is carried by one of said legs adjacent the inner end thereof and foot operable control means is carried by said one leg adjacent the outer end thereof.

13. The helicopter of claim 10, with the collapsible parts thereof in collapsed state, and banding means surrounding said chassis and the collapsed parts to provide a columnar-like readily transportable package.

References Cited in the file of this patent

UNITED STATES PATENTS

| | | |
|---|---|---|
| 1,578,073 | Caproni | Mar. 23, 1926 |
| 2,373,467 | Frakes | Apr. 10, 1945 |
| 2,405,777 | Buivid | Aug. 13, 1946 |
| 2,425,306 | Conner | Aug. 12, 1947 |
| 2,461,348 | Pentecost | Feb. 8, 1949 |
| 2,481,750 | Hiller | Sept. 13, 1949 |
| 2,738,021 | Nagler | Mar. 13, 1956 |
| 2,922,603 | Smith | Jan. 26, 1960 |